(12) United States Patent
Ray (10) Patent No.: US 6,424,782 B1
(45) Date of Patent: Jul. 23, 2002

(54) FIBER OPTIC SPLICE CLOSURE AND METHOD OF ROUTING OPTICAL FIBER RIBBONS

(75) Inventor: Craig D. Ray, Cary, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/639,135

(22) Filed: Aug. 15, 2000

(51) Int. Cl.⁷ ................................................. G02B 6/00
(52) U.S. Cl. ....................................................... 385/135
(58) Field of Search ................................. 385/135, 95

(56) References Cited

U.S. PATENT DOCUMENTS

| | | | | |
|---|---|---|---|---|
| 4,626,067 A | * | 12/1986 | Watson | 385/86 |
| 4,648,168 A | * | 3/1987 | Nolf et al. | 385/135 |
| 5,278,933 A | * | 1/1994 | Hunsinger et al. | 385/135 |
| 5,323,480 A | | 6/1994 | Mullaney et al. | 385/135 |
| 5,333,233 A | | 7/1994 | Mansfield et al. | 385/134 |
| 5,428,705 A | * | 6/1995 | Hermsen et al. | 385/135 |
| 5,440,666 A | | 8/1995 | Burek et al. | 385/135 |
| 5,469,526 A | * | 11/1995 | Rawlings | 385/135 |
| 5,515,472 A | * | 5/1996 | Mullaney et al. | 385/135 |
| 5,850,494 A | | 12/1998 | O'Dell | 385/137 |
| 6,014,490 A | | 1/2000 | Canning et al. | 385/135 |
| 6,052,502 A | | 4/2000 | Coleman | 385/114 |
| 6,275,641 B1 | * | 8/2001 | Daoud | 385/135 |

* cited by examiner

*Primary Examiner*—Tulsidas Patel
(74) *Attorney, Agent, or Firm*—Allen, Dyer, Doppelt, Milbrath & Gilbrath, P.A.

(57) ABSTRACT

A method of routing optical fiber ribbons within a fiber optic splice closure is disclosed. A plurality of optical fiber ribbons are exposed for a splicing operation. The optical fiber ribbons are stacked in a sequential arrangement within a fiber optic feed tube positioned within a fiber optic splice closure. A ribbon organizer is installed over the optical fiber ribbons at an opening of the fiber optic feed tube. The interior dimensions of the ribbon organizer substantially match the size and shape of the plurality of optical fiber ribbons. The original stacked, sequential arrangement of the optical fiber ribbons are re-established by sliding the ribbon organizer down along the length of the optical fiber ribbons, thereby orienting the optical fiber ribbons into their original positions as they are within the fiber optic feed tube.

31 Claims, 6 Drawing Sheets

FIBER OPTIC SPLICE CLOSURE AND METHOD OF ROUTING OPTICAL FIBER RIBBONS

FIELD OF THE INVENTION

This invention relates to the field of fiber optic splice closures, and more particularly, this invention relates to the field of fiber optic splice closures and the routing of optical fiber ribbons therein.

BACKGROUND OF THE INVENTION

Fiber optic cables often contain multiple optical fiber ribbons arranged in a stacked, sequential formation. These fiber optic cables containing the optical fiber ribbons connect into a fiber optic splice closure such as disclosed in U.S. Pat. No. 5,323,480, assigned to Raychem Corporation, the disclosure which is hereby incorporated by reference in its entirety.

The fiber optic splice closure in the '480 patent includes a housing having a cable termination that secures one or more fiber optic cables into the housing. A plurality of splice trays are positioned within the housing and each have an end pivotally connected to a bracket and moveable between a stacked position and raised position to facilitate access to an underlying splice tray. Transport tubes protect the optical fibers and optical fiber ribbons, despite any bending of the fibers and ribbons. As disclosed, optical fiber ribbons, such as LightPack® fiber optic cables, are offered by AT&T and other companies and can be readily bent only in a direction normal to their major dimension, which is equivalent to a minimum bend radius of individual fibers. The '480 patent discloses these generally flexible transport tubes, which carry optical fibers from one or more fiber optic cables to respective splice trays. Each transport tube has a longitudinal axis and a mechanism for imparting to the transport tube a differential flexibility between first and second directions transverse to the longitudinal axis.

Although the '480 patent discloses a mechanism for imparting differential flexibility, this splice closure does not provide a solution for arranging optical fiber ribbons after they are cleaned, routed and spliced. During any cleaning and routing stages, the original stacked formation of any optical fiber ribbons is lost. Identification of each ribbon must be re-established, usually at the ends, before splicing can be completed. In an attempt to solve this problem, some workers label each ribbon along its length. This labeling, however, is often hard to see and sometimes comes off during cleaning. After the optical fiber ribbons are spliced, there is also no guaranty that the ribbons can be removed back to the central core tube (CCT) or a loose buffer tube (LBT), without the optical fiber ribbons being entangled with the other ribbons.

Another disadvantage of a round feed tube, such as the disclosed transport tubes, is the poor alignment of optical fiber ribbons. Also, the ribbons rotate within the round tube and are allowed to bend in any plane. When adjusting individual ribbons longitudinally within a round tube that has been routed (containing bends), pressure could be exerted to the innermost ribbons, specifically the first and last (usually the number 12 ribbon) of the innermost optical fiber ribbon. This high stress area exists because of the contour difference between the external ribbon stack (of rectangular profile) and the internal wall of a round tube. Additionally, a high coefficient of friction exists when adjusting one of a group of ribbons longitudinally in the typical round tube. The ribbon group is typically either not in a stacked formation or a helix exists along the routed length making individual ribbon movement restrictive.

SUMMARY OF THE INVENTION

The present invention is advantageous and uses a ribbon organizer that has an interior dimension that substantially matches the size and shape of a plurality (or stack) of optical fiber ribbons. In operation, a plurality of optical fiber ribbons are stacked together in a group and exposed for a splicing operation. The ribbon organizer of the present invention is installed over the optical fiber ribbons at an opening of the fiber optic feed tube. The interior dimensions of the ribbon organizer substantially match the size and shape of the plurality of optical fiber ribbons. The original stacked, sequential arrangement of the optical fiber ribbons is re-established by sliding the ribbon organizer down along the length of the optical fiber ribbons, thereby orienting the optical fiber ribbons into their original positions as they are within the fiber optic feed tube.

The ribbon organizer is preferably rectangular configured, and in one step, can comprise the step of longitudinally splitting a ribbon organizer that is slid along its length, and then wrapping the split ribbon organizer around the optical fiber ribbons. In yet another aspect, the method can comprise the step of installing the rectangular configured ribbon organizer by sliding the ribbon organizer over the fiber optic feed tube at a location where the optical fiber ribbons extend out of the fiber optic feed tube. In yet another aspect of the present invention, grease can be blocked from migrating out of the fiber optic feed tube by sliding the ribbon organizer into the fiber optic feed tube.

A plurality of ribbon organizers can also be grouped along a plurality of optical fiber ribbons for controlling the storing and routing of fibers within the fiber optic splice closure. The fiber optic feed tube can comprise one of either a central core tube or loose buffer tube. The ribbon organizer can be formed from substantially flexible material to allow bending of the optical fiber ribbons without twisting and bending of the optical fiber ribbons. The ribbon organizer can also include dual channels for allowing two sets of a plurality of optical fiber ribbons to be organized. The ribbon organizer is substantially rectangular configured in one aspect of the present invention.

In yet another aspect of the present invention, a fiber optic splice closure includes a housing and a fiber optic feed tube secured to the housing. The fiber optic feed tube has a plurality of fiber optic ribbons. A plurality of splice trays are pivotally mounted within the housing for receiving spliced fiber optic ribbons. The splice trays are moveable between a stacked position and a raised position that facilitates access to an underlying splice tray. A ribbon organizer is positioned over the optical fiber ribbons and has interior dimensions that substantially match the size and shape of the optical fiber ribbons. These are positioned so as to re-establish an original stacked, sequential arrangement of the optical fiber ribbons into their original positions as they are within the fiber optic feed tube.

In yet another aspect of the present invention, the ribbon organizer is substantially rectangular configured and includes dual channels for allowing two sets of a plurality of optical fiber ribbons to be organized. The ribbon organizer can also be inserted within a fiber optic feed tube to aid in blocking grease from migrating out of the fiber optic feed tube.

In still another aspect of the present invention, the ribbon organizer can contain a tracer mark to identify a side containing a first optical fiber ribbon. This ribbon group will not rotate inside the ribbon organizer even during twisting and bending of the organizer. The ribbon organizer can typically include a two orifice or single orifice rectangular shaped organizer.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously allows fiber optic ribbons to be routed, detected, maintained and re-established in an original order that a group of optical fiber ribbons are contained within a fiber optic feed tube such as a central core tube or loose buffer tube, without being entangled with other optical fiber ribbons. By installing a section of a ribbon organizer onto stacked ribbons as the stack exits the central core tube or loose buffer tube, the original ribbon formation can be maintained during cleaning, routing and splicing of the optical fiber ribbons along the ribbon length. To re-establish an original stacked formation, the ribbon organizer is slid down the length of the ribbons towards the ribbon ends and the fibers are "combed" to their original position. By grouping a plurality of ribbon organizers along the optical fiber ribbons, it is possible to control the storage and routing of fibers within the fiber optic splice closure.

The present invention also is advantageous because the combination of the ribbon organizer profile and its height-to-width aspect ratio and the orientation of the ribbons will promote bending along the flat plane of the stacked ribbons, thus reducing the chance of macrobending. This can be possible regardless of the original orientation of the tube.

Figure 1:
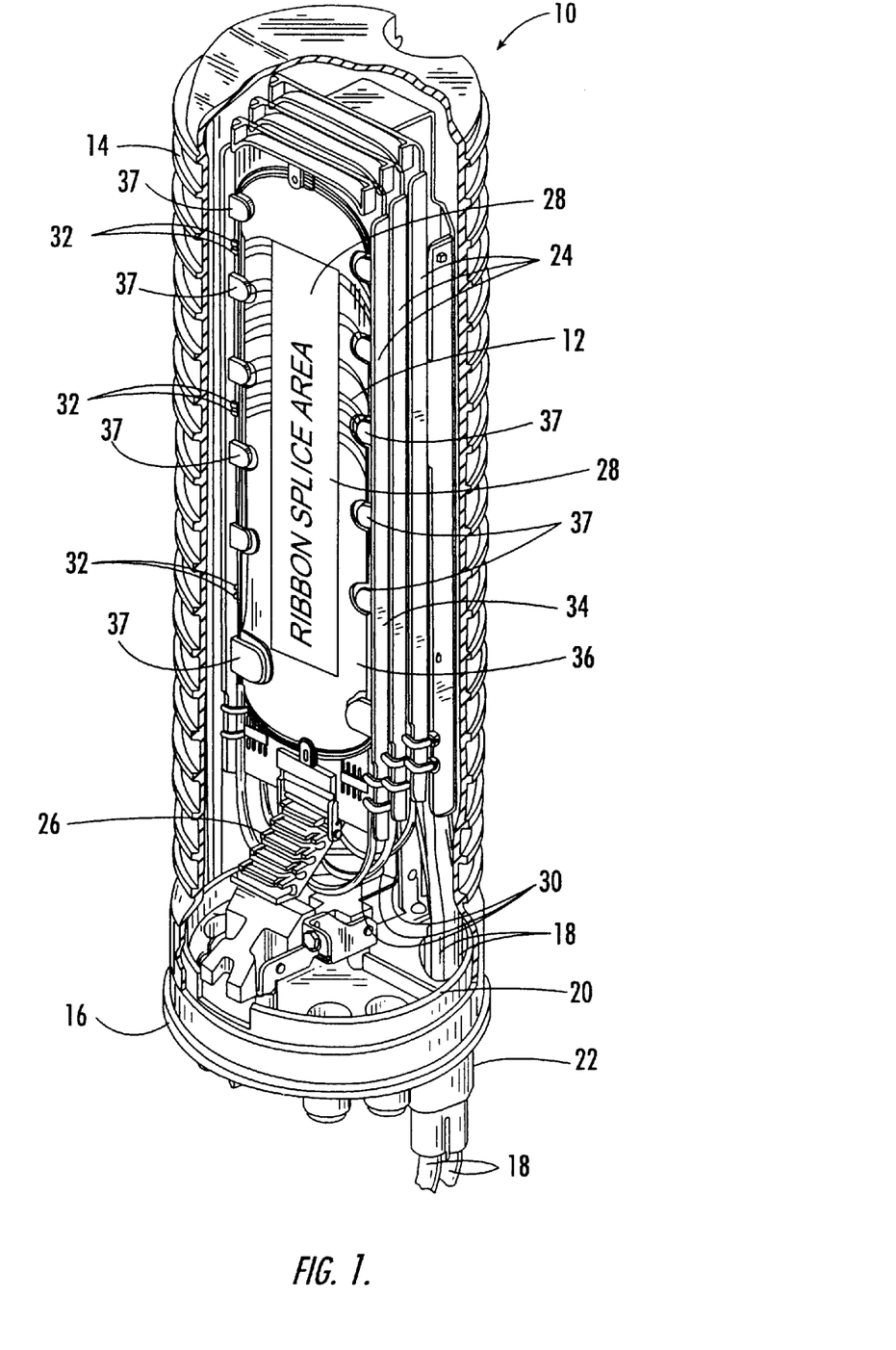
FIG. 1 is a cut away perspective view of a fiber optic splice closure according to the invention.

FIG. 1 illustrates a fiber optic splice closure 10 that can be used for organizing optical fiber ribbons 12. The illustrated embodiment of the splice closure 10 is used for a butt-splice. It should be understood, however, that the present invention can used with other splice closures, such as for in-line or other splicing.

The splice closure 10 includes a generally cylindrical housing 14 having an end cap 16 positioned at one end of the housing, as known to those skilled in the art. One or more fiber optic cables 18 can enter the housing 14 through an opening 20 in the end cap 16 and can be secured by techniques, such as a conventional strain relief clamp 22 or other known means.

Splice trays 24 are pivotally connected at one end to a mounting bracket 26, which is connected to an inside face of the end cap 16 as shown in the lower portion of FIG. 1. Each splice tray 24 includes a ribbon splice area 28 at the center portion that allows the splicing of optical fiber ribbons by splicing techniques known to those skilled in the art. Although ribbon splices are described, regular fiber splices could also be accomplished.

Figures 2, 3:
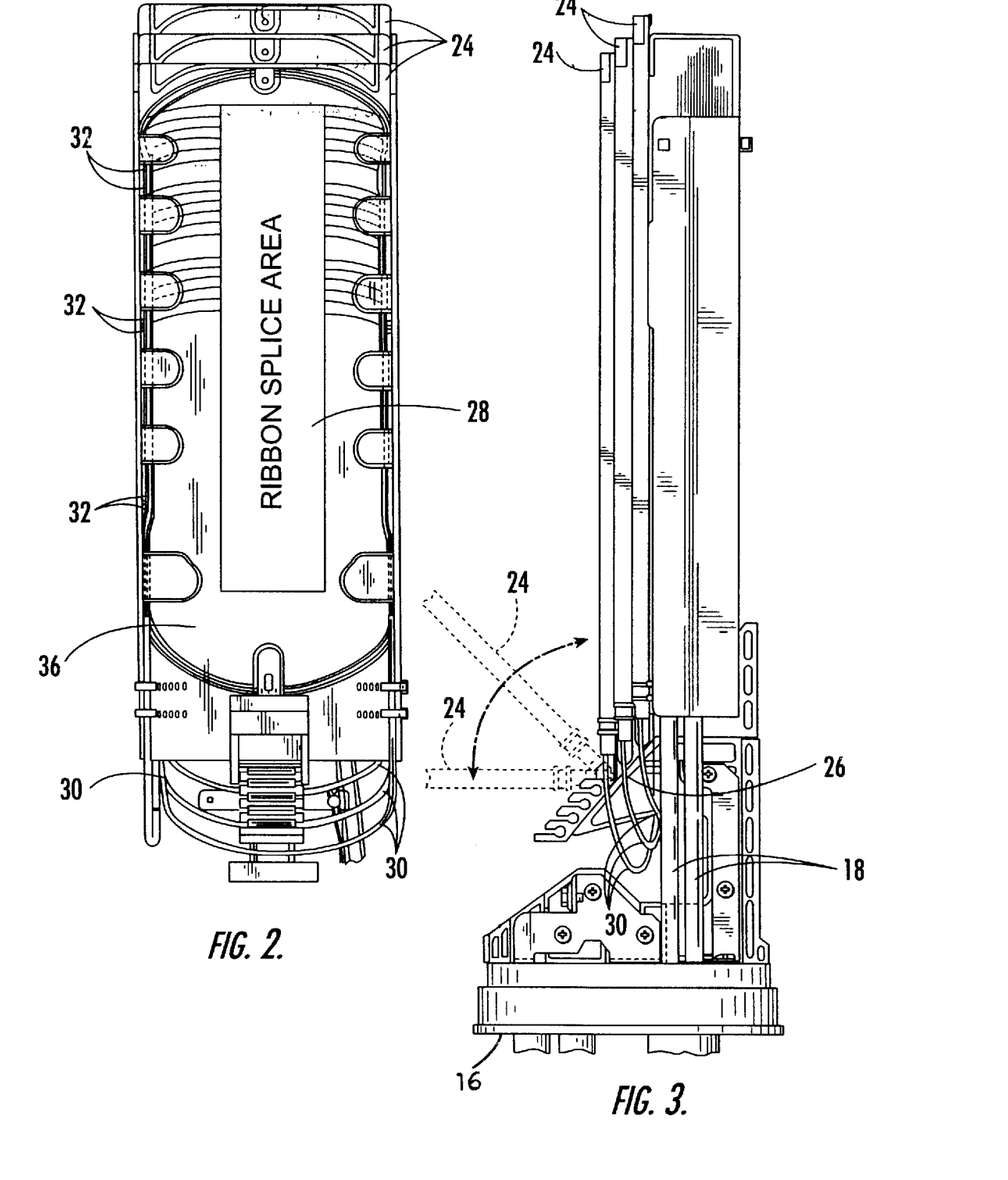
FIG. 2 is a plan view of the fiber optic splice closure with the housing and end cap removed to illustrate the series of stacked splice trays and the ribbon splice area.
FIG. 3 is a side elevation view of the fiber optic splice closure with the housing removed to illustrate the series of stacked splice trays and slack storage tray.

The individual splice trays 24 are moveable between a stacked position and a raised position to facilitate access to an underlying splice tray as shown in FIG. 3. The optical fiber ribbons 12 from the optical fiber cables are carried by flexible fiber optic feed tubes 30 (or transport tubes as sometimes referred) to respective splice trays and other areas. The tubes 30 are flexible to permit splice trays to be moved between stacked and raised positions, but are also sufficiently rigid to prevent sharply bending any optical fiber ribbons more than desired.

Although not shown in detail, a pair of spaced apart ridges 32 extend from opposing sidewalls 34 of each splice tray 24. Each splice tray 24 includes a generally rectangular base 36 and the pair of opposing sidewalls 34 extending outwardly therefrom with tabs 37 for holding down the ribbons 12. The ridges 32 on the sidewalls permit a technician to insert a hooked probe therebetween to engage and separate out predetermined fibers and optical fiber ribbons from any adjacent slack fibers and optical fiber ribbons.

Figure 6:
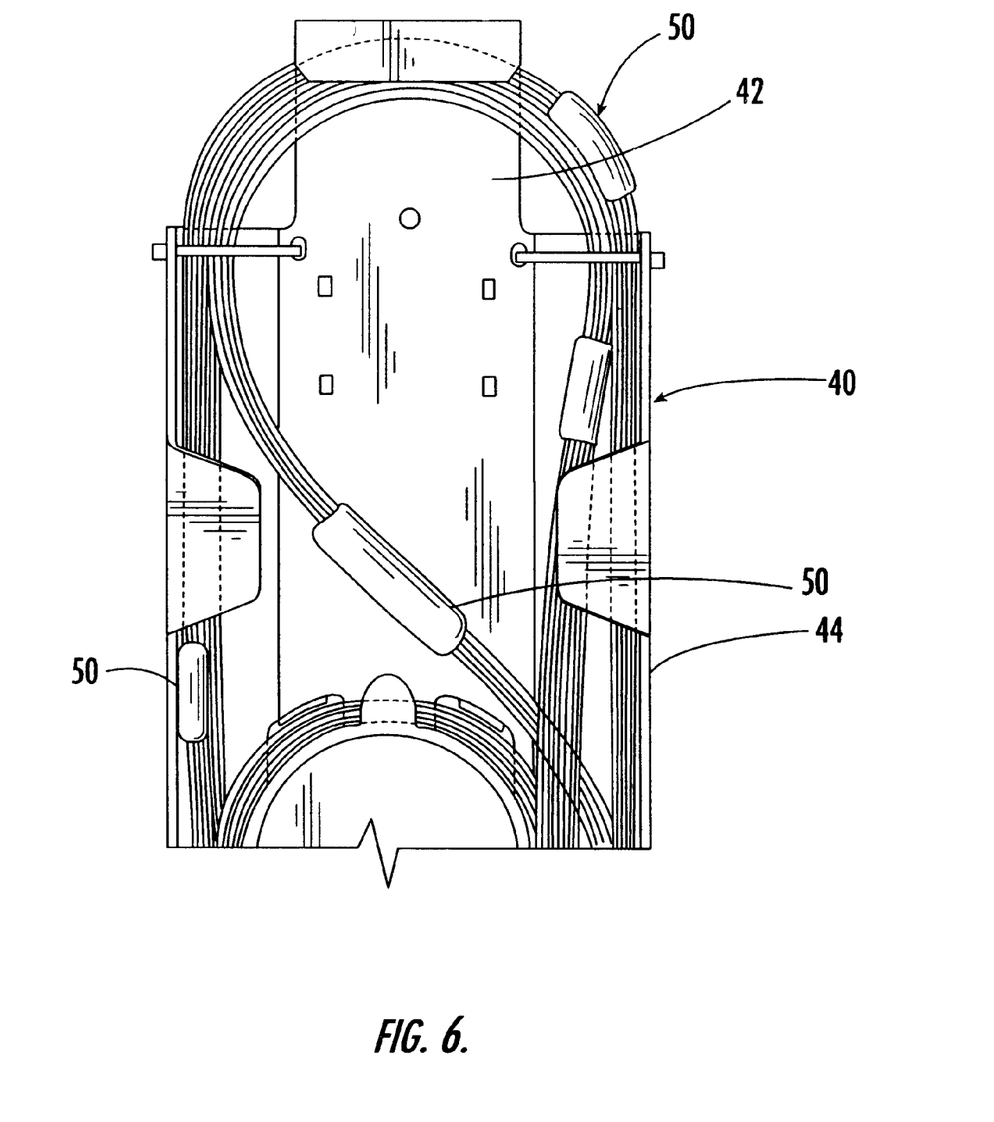
FIG. 6 is a plan view of a portion of the slack storage tray and showing a plurality of fiber optic ribbons with a grouping of ribbon organizers thereon.

The splice closure also includes a slack storage tray 40, such as shown in FIG. 6, connected at one end to the mounting bracket 26 and positioned below the splice trays 24. The slack storage tray 40 includes a generally rectangular base 42 and opposing sidewalls 44.

Figure 4:
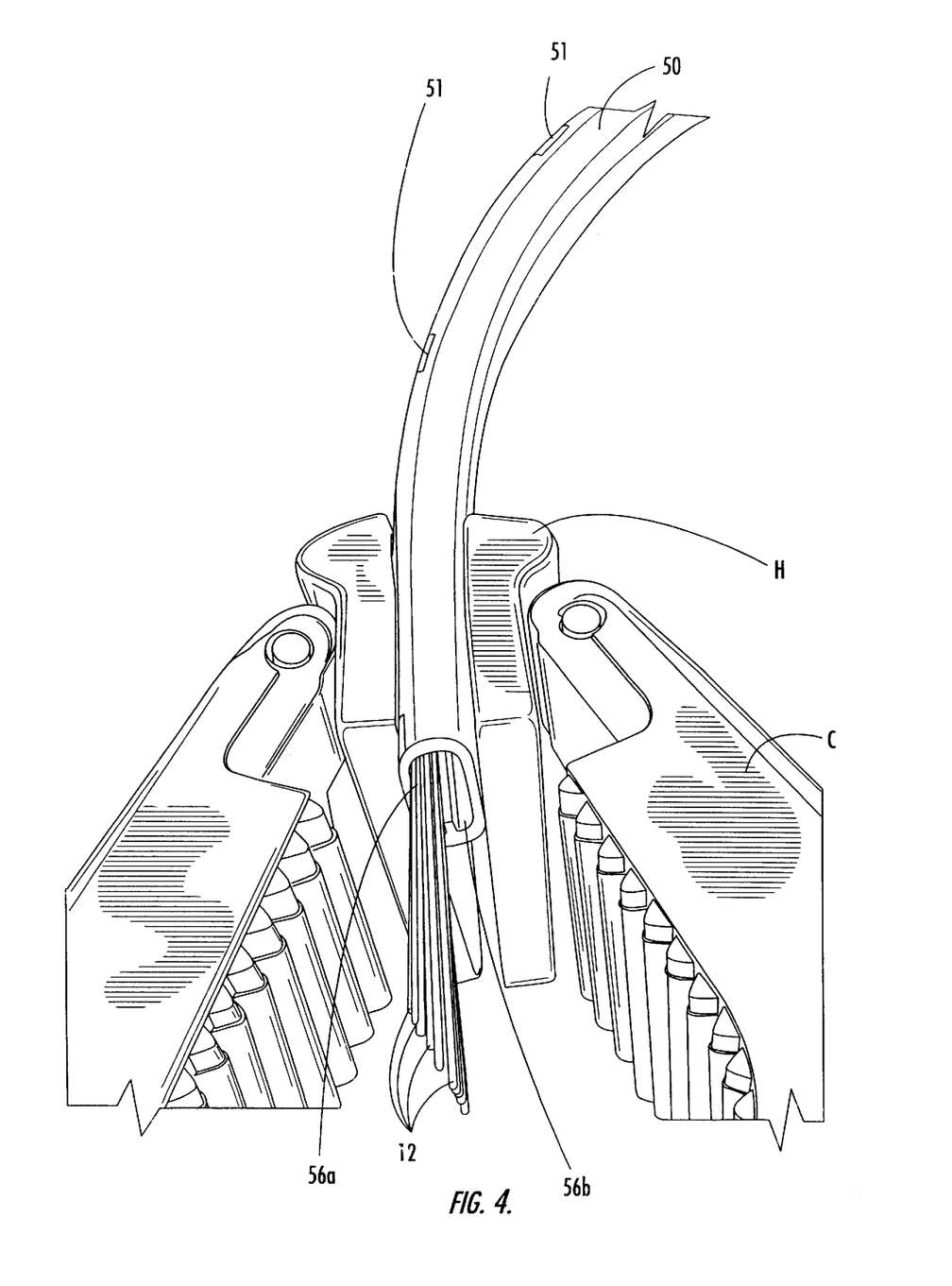
FIG. 4 is an enlarged view of the ribbon organizer of the present invention held in a clamp mechanism and containing in one channel a plurality of optical fiber ribbons.
Figure 7:
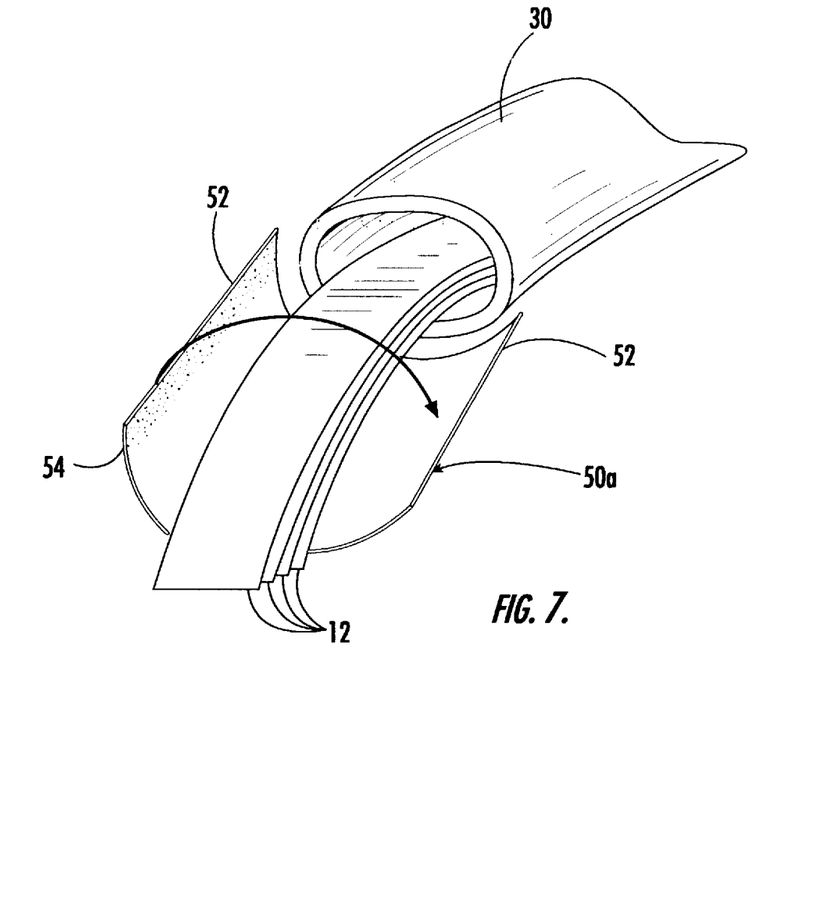
FIG. 7 is a generally fragmentary perspective view of a split apart ribbon organizer that is folded about the optical fiber ribbons.

FIG. 4 shows a ribbon organizer 50 of the present invention held at one end by a clamp C and clamp holder H. As shown in FIG. 4, the rectangular configured ribbon organizer 50 has been placed over the optical fiber ribbons 12, preferably adjacent an opening of the fiber optic feed tube 30, such as shown in FIG. 7, showing the proximity of the two. The interior dimensions of the ribbon organizer 50 substantially match the size and shape of the plurality of optical fiber ribbons as shown in FIG. 4 when stacked. The plurality of optical fiber ribbons are stacked as a group and extend from the fiber optic feed tube 30 to be exposed for slicing. At this time, the ribbon organizer 50 is inserted over the optical fiber ribbons. In one aspect of the present invention, the ribbon organizer 50 is slid over the optical fiber ribbons at a location where the optical fiber ribbons extend out of the fiber optic feed tube. A tracer mark 51 is placed on one side of the ribbon organizer, and identifies the side of the ribbon organizer that will contain the first optical ribbon contained in the stacked sequential arrangement within the fiber optic feed tube.

In another aspect of the present invention, it is possible to form the ribbon organizer 50a as a different embodiment, having a longitudinal split 52, such that the ribbon organizer is split apart and then wrapped about the optical fiber ribbons as shown in FIG. 7. The ribbon organizer 50a in this embodiment can include self-adhesive 54 to allow the overlapping edges to be retained to each other.

Figure 5:
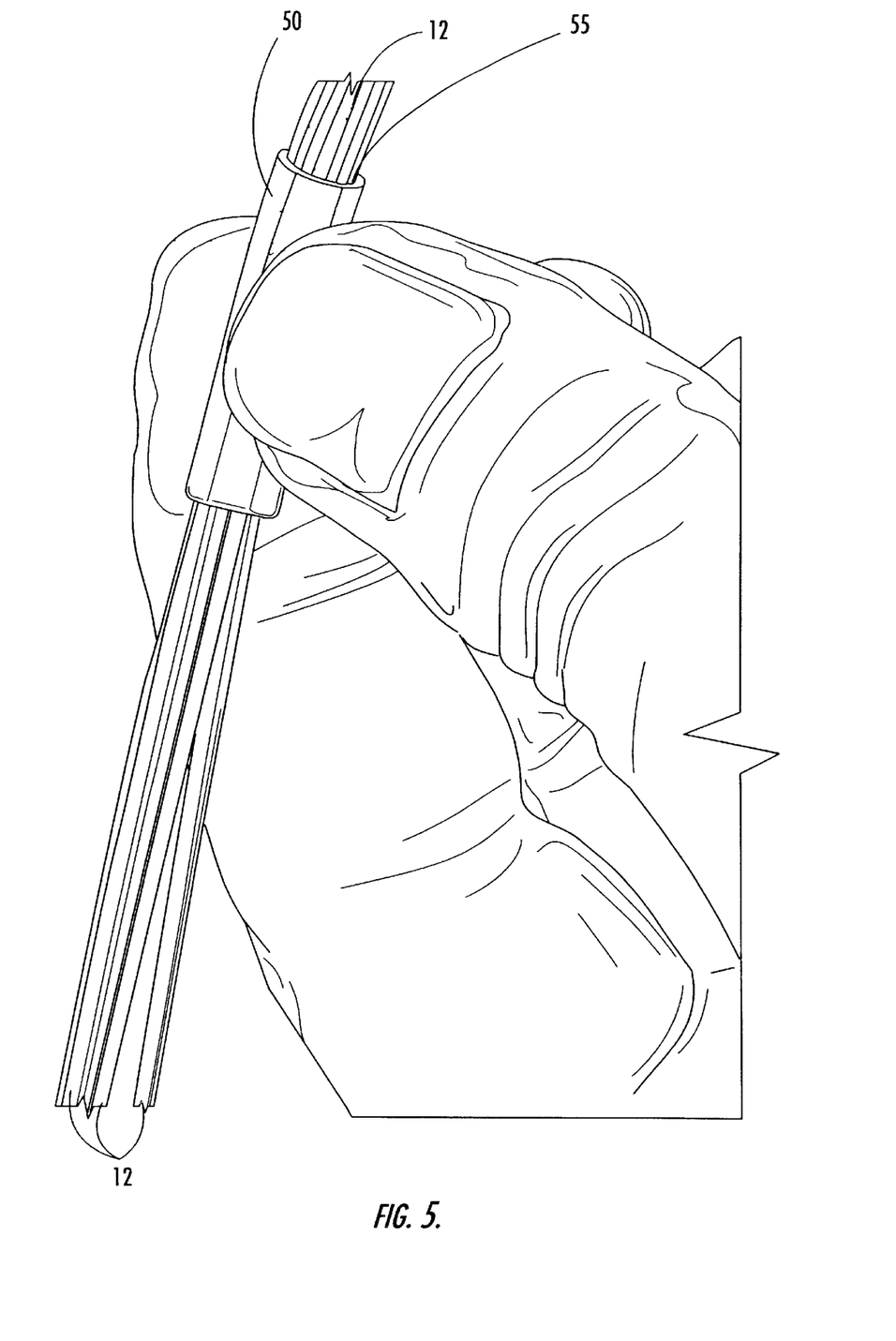
FIG. 5 is an enlarged perspective view of a person sliding the ribbon organizer of the present invention along a set of fiber optic ribbons to arrange them in the proper stacked, sequential arrangement.

The ribbon organizer is preferably formed from a flexible material, such as a plastic or similar material, and can be either a single channel 55 or dual channel 56a, 56b as shown in FIG. 4. If a wrap around ribbon organizer is used as shown in FIG. 7, then only a single channel 55 is formed. As shown in FIG. 4, the interior dimensions of the channels ribbon organizer substantially match the size and shape of the plurality of optical fiber ribbons that are organized into a stacked, sequential arrangement. The original stacked, sequential arrangement of the optical fiber ribbons can be re-established by sliding the ribbon organizer 50 down along the length of the optical fiber ribbons (FIG. 5), thereby orienting the optical fiber ribbons into their original positions as they are positioned within the fiber optic feed tube. Routing inside the ribbon organizer eliminates any helix pattern of the optical fiber ribbons.

FIG. 6 illustrates how a plurality of ribbon organizers 50 can be grouped along a set of optical fiber ribbons for controlling the storage and routing of fibers within the fiber optic splice closure and storing them on the storage tray, such as shown in FIG. 6.

Figure 8:
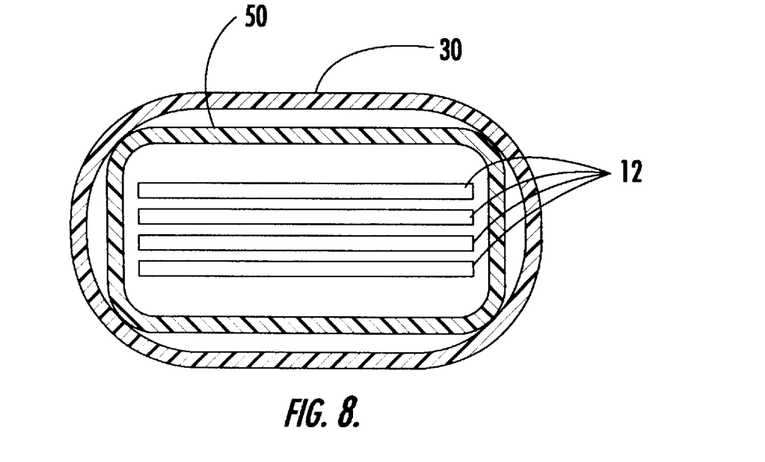
FIG. 8 is a sectional view showing the ribbon organizer inserted within a fiber optic feed tube to block grease from migrating out of the fiber optic feed tube.

As shown in FIG. 8, the ribbon organizer 50 can be slid into a fiber optic feed tube 30 to aid in blocking grease from migrating out of the fiber optic feed tube. Although it is possible for some grease to migrate out, the ribbon organizer does provide a blocking area for any grease contained therein.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of routing optical fiber ribbons within a fiber optic splice closure comprising the steps of:
   exposing for a splicing operation a plurality of optical fiber ribbons that are stacked in a sequential arrangement within a fiber optic feed tube positioned within a fiber optic splice closure;
   installing a ribbon organizer over the optical fiber ribbons at an opening of the fiber optic feed tube, wherein the interior dimensions of the ribbon organizer substantially match the size and shape of the plurality of optical fiber ribbons; and
   re-establishing the original stacked, sequential arrangement of the optical fiber ribbons by sliding the ribbon organizer down along the length of the optical fiber ribbons thereby orienting the optical fiber ribbons into their original positions as they are within the fiber optic feed tube.

2. A method according to claim 1, wherein the step of installing the ribbon organizer further comprises the step of longitudinally splitting apart a ribbon organizer that is slit along its length and wrapping the split ribbon organizer around the optical fiber ribbons.

3. A method according to claim 1, wherein the step of installing the ribbon organizer further comprises the step of sliding the ribbon organizer over the fiber optic ribbons at a location where the optical fiber ribbons extend out of the fiber optic feed tube.

4. A method according to claim 1, and further comprising the step of sliding the ribbon organizer into the fiber optic feed tube to aid in blocking grease from migrating out of the fiber optic feed tube.

5. A method according to claim 1, and further comprising the step of grouping a plurality of ribbon organizers along the plurality of optical fiber ribbons for controlling the storage and routing of optical fiber ribbons within the fiber optic splice closure.

6. A method according to claim 1, wherein the fiber optic feed tube comprises one of either a central core tube or a loose buffer tube.

7. A method according to claim 1, wherein the ribbon organizer is formed from a substantially flexible material to allow bending of the optical fiber ribbons without twisting of the optical fiber ribbons.

8. A method according to claim 1, wherein the ribbon organizer includes dual channels for allowing two sets of a plurality of optical fiber ribbons to be organized.

9. A method according to claim 1, wherein the ribbon organizer is substantially rectangular configured and is configured to promote bending along the flat plane.

10. A method of routing optical fiber ribbons within a fiber optic splice closure comprising the steps of:
    exposing for a splicing operation a plurality of optical fiber ribbons that are stacked in a sequential arrangement within a fiber optic feed tube positioned within a fiber optic splice closure;
    installing a substantially rectangular configured ribbon organizer over the optical fiber ribbons at an opening of the fiber optic feed tube, wherein the interior dimensions of the ribbon organizer substantially match the size and shape of the plurality of optical fiber ribbons;
    re-establishing the original stacked, sequential arrangement of the optical fiber ribbons by sliding the ribbon organizer down along the length of the optical fiber ribbons thereby orienting the optical fiber ribbons into their original positions as they are within the fiber optic feed tube; and
    grouping a plurality of ribbon organizers along the plurality of optical fiber ribbons for controlling the storage and routing of fibers within the fiber optic splice closure.

11. A method according to claim 10, wherein the step of installing the rectangular configured ribbon organizer further comprises the step of longitudinally splitting a ribbon organizer that is slit along its length and wrapping the split ribbon organizer around the optical fiber ribbons.

12. A method according to claim 10, wherein the step of installing the rectangular configured ribbon organizer further comprises the step of sliding the ribbon organizer over the fiber optic feed tube at a location where the optical fiber ribbons extend out of the fiber optic feed tube.

13. A method according to claim 10, and further comprising the step of sliding the organizer tube into the fiber optic feed tube to aid in blocking grease from migrating out of the feed tube.

14. A method according to claim 10, wherein the fiber optic feed tube comprises one of either a central core tube or a loose buffer tube.

15. A method according to claim 10, wherein the ribbon organizer is formed from a substantially flexible material to allow bending of the optical fiber ribbons without twisting of the optical fiber ribbons.

16. A method according to claim 10, wherein the ribbon organizer includes dual channels for allowing two sets of a plurality of optical fiber ribbons to be organized.

17. A method according to claim 10, wherein the ribbon organizer is substantially rectangular configured and configured to promote bending along the flat plane.

18. A method of routing optical fiber ribbons within a fiber optic splice closure comprising the steps of:

exposing for a splicing operation a plurality of optical fiber ribbons that are stacked in a sequential arrangement within a fiber optic feed tube positioned within a fiber optic splice closure;

installing a ribbon organizer over the optical fiber ribbons at an opening of the fiber optic feed tube, wherein the interior dimensions of the ribbon organizer substantially match the size and shape of the plurality of optical fiber ribbons, and including a tracer mark for identifying the side of the ribbon organizer that will contain the first optical fiber ribbon contained in the stacked sequential arrangement within the fiber optic feed tube; and re-establishing the original stacked, sequential arrangement of the optical fiber ribbons by sliding the ribbon organizer down along the length of the optical fiber ribbons thereby orienting the optical fiber ribbons into their original positions as they are within the fiber optic feed tube.

19. A method according to claim 18, wherein the step of installing the rectangular configured ribbon organizer further comprises the step of longitudinally splitting an organizer tube that is slit along its length and wrapping the split organizer tube around the optical fiber ribbons.

20. A method according to claim 18, wherein the step of installing the rectangular configured ribbon organizer further comprises the step of sliding the ribbon organizer over the fiber optic feed tube at a location where the optical fiber ribbons extend out of the fiber optic feed tube.

21. A method according to claim 18, and further comprising the step of sliding the ribbon organizer into the fiber optic feed tube to aid in blocking grease from migrating out of the fiber optic feed tube.

22. A method according to claim 18, and further comprising the step of grouping a plurality of ribbon organizers along the plurality of optical fiber ribbons for controlling the storage and routing of optical fiber ribbons within the fiber optic splice closure.

23. A method according to claim 18, wherein the fiber optic feed tube comprises one of either a central core tube, a loose buffer tube or fiber optic cable.

24. A method according to claim 18, wherein the ribbon organizer is formed from a substantially flexible material to allow bending of the optical fiber ribbons without twisting of the optical fiber ribbons.

25. A method according to claim 18, wherein the ribbon organizer includes dual channels for allowing two sets of a plurality of optical-fiber ribbons to be organized.

26. A method according to claim 18, wherein the ribbon organizer is substantially rectangular configured and configured to promote bending along the flat plane.

27. A fiber optic splice closure comprising:

a housing;

a fiber optic feed tube secured to said housing, said fiber optic feed tube having a plurality of fiber optic ribbons;

a plurality of splice trays pivotally mounted within the housing for receiving spliced fiber optic ribbons and movable between a stacked position and a raised position that facilitates access to an underlying splice tray; and a substantially rectangular configured ribbon organizer initially positioned over the optical fiber ribbons at an opening of the fiber optic feed tube and having interior dimensions that substantially match the size and shape of the plurality of optical fiber ribbons, and having been positioned so as re-establish an original stacked sequential arrangement of the optical fiber ribbons into their original positions as they are within the fiber optic feed tube.

28. A fiber optic splice closure according to claim 27, wherein said ribbon organizer comprises dual channels for allowing two sets of a plurality of optical fiber ribbons to be organized.

29. A fiber optic splice closure according to claim 27, wherein said ribbon organizer is inserted within the fiber optic feed tube to aid in blocking grease from migrating out of the fiber optic fiber optic feed tube.

30. A fiber optic splice closure according to claim 27, and further comprising a plurality of ribbon organizers positioned along the plurality of optical fiber ribbons for controlling storage and routing of fibers within the fiber optic splice closure.

31. A fiber optic splice closure according to claim 27, wherein said ribbon organizer has a height-to-width aspect ratio to promote bending along the flat plane.

* * * * *